United States Patent
Oliver

[15] 3,652,284
[45] Mar. 28, 1972

[54] PHOTOGRAPHIC SILVER HALIDE EMULSION CONTAINING A METHINE DYE

[72] Inventor: Gene L. Oliver, Pittsford, N.Y.

[73] Assignee: Eastman Kodak Company, Rochester, N.Y.

[22] Filed: Nov. 4, 1968

[21] Appl. No.: 773,291

[52] U.S. Cl. ..........................96/84 R, 96/67, 96/130
[51] Int. Cl. ..........................................G03c 1/12
[58] Field of Search..................96/84, 67, 88, 102, 106, 130; 260/240, 240.2, 240.4, 294.8 F, 306.7, 307

[56] References Cited

UNITED STATES PATENTS

| | | | |
|---|---|---|---|
| 2,535,276 | 12/1950 | Edwards et al. | 260/306.7 |
| 2,756,149 | 7/1956 | Saunders et al. | 96/84 |
| 3,288,610 | 11/1966 | Gotze et al. | 96/106 |
| 3,247,127 | 4/1966 | Bailey | 96/84 X |
| 3,282,699 | 11/1966 | Jones et al. | 96/84 |

Primary Examiner—William D. Martin
Assistant Examiner—Theodore G. Davis
Attorney—W. H. J. Kline, J. R. Frederick and O. H. Webster

[57] ABSTRACT

Novel methine dyes are provided which feature a bis(alkylsulfonyl)allylidene (or -pentadienylidene) group or a diaryloxysulfonyl allylidene (or -pentadienylidene group. The dyes are useful as filter dyes in photographic materials. Certain dyes of the invention function as spectral sensitizers for photographic silver halide emulsions.

16 Claims, No Drawings

PHOTOGRAPHIC SILVER HALIDE EMULSION CONTAINING A METHINE DYE

This invention relates to novel dyes and photographic materials containing such dyes.

It is known to employ light-screening substances in photographic elements for antihalation purposes and for protecting a light-sensitive emulsion or emulsions from the action of light which it is not desired to record. For example, light-screening substances are often required (a) in backing layers on either side of the support to reduce halation, (b) in overcoats on photographic elements to protect the light sensitive emulsion or emulsions from the effects of ultraviolet light, particularly in the case of color photographic elements, and (c) in interlayers between differentially color-sensitized emulsions to protect an underlying emulsion layer or layers from unwanted action of certain wavelengths of light. However, many of the light-screening substances that have been employed for the purposes indicated above are not resistant to diffusion and wander from their desired position or positions in the photographic element. Furthermore, many of them do not have sufficiently sharp absorption maxima and high extinction coefficients in the desired regions of the spectrum.

It is, accordingly, an object of this invention to provide methine dyes which absorb strongly in the ultraviolet and near ultraviolet regions of the spectrum.

Another object of this invention is to provide light sensitive photographic materials containing in a layer thereof one or more of the novel dyes of the invention.

Still another object of this invention is to provide a support having a filter layer thereon containing a dye in accordance with this invention.

Another object of this invention is to provide means for preparing the novel dyes and photographic materials of the invention.

Other objects will be apparent from this disclosure and the appended claims.

I have now discovered that certain methine dyes derived from $\beta$-disulfones and from aryl esters of methanedisulfonic acid are especially useful as filter dyes, e.g., in light sensitive photographic silver halide materials, as light-screening layers therein. These dyes not only have desirably sharp absorption maxima and high extinction coefficients, but also show very high resistance to diffusion and remain firmly fixed in the applied positions in the photographic element. They are further characterized by providing photographic filter layers which absorb to appreciably shorter wavelengths in the ultraviolet region of the spectrum as compared with similar layers prepared with any of the previously known related methine type of dyes. This is of particular advantage in certain photographic applications. The dyes are further useful for the preparation of non-light sensitive photographic elements such as diffusion transfer sheets (color and black-and-white), etc. In addition, a number of the dyes of the invention are also useful as spectral sensitizers in light sensitive silver halide emulsions.

The methine dyes of this invention include merocyanine and oxonol type dyes. In one embodiment of the invention, merocyanine dyes are provided comprising a five- to six-membered nitrogen containing heterocyclic nucleus of the type used in cyanine dyes substituted on a carbon atom thereof (preferably the two-carbon atom) with a 3,3-bis(alkylsulfonyl) allylidene group; a 5,5-bis (alkylsulfonyl)-2,4-pentadienylidene group; a 3,3-diaryloxysulfonylallylidene group; or, a 5,5-diaryloxysulfonyl-2,4-pentadienylidene group.

In another embodiment of the invention, oxonol dyes are provided comprising a bis[bis(alkylsulfonyl)methane]trimethine (or pentamethine) oxonol salts, or bis (diarylmethanedisulfonate) trimethine (or pentamethine) oxonol salts. These salts can be alkali metal salts such as sodium, potassium, etc., or ammonium salts or amine salts such as triethylamine, pyridine, aniline, piperidine, etc.

The preferred novel methine dyes of this invention include those represented by the following formulas:

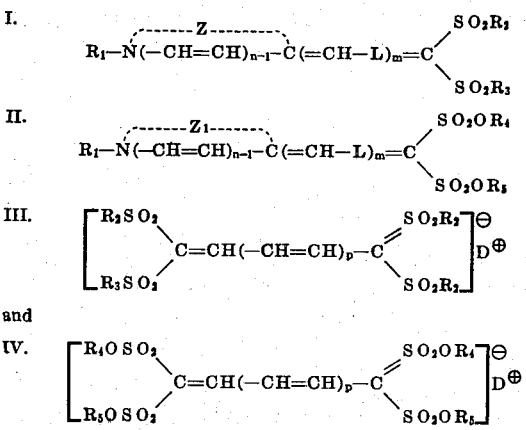

wherein $n$, $m$ and $p$ each represents a positive integer of from 1 to 2; L represents a methine linkage, e.g., $-CH =$ , $-C(CH_3)=$ , $-C(C_6H_5) =$ , etc.; $R_1$ represents an alkyl group, including substituted alkyl, (preferably a lower alkyl containing from one to four carbon atoms), e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as a hydroxyalkyl group, e.g., $\beta$-hydroxyethyl, $\omega$-hydroxybutyl, etc., an alkoxyalkyl group, e.g., $\beta$-methoxyethyl, $\omega$-butoxybutyl, etc., a carboxyalkyl group, e.g., $\beta$-carbosyethyl, $\omega$-carboxybutyl, etc.; a sulfoalkyl group, e.g., $\beta$-sulfoethyl, $\omega$-sulfobutyl,etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-acetoxypropyl, $\omega$-butyryloxybutyl, etc., an alkoxycarbonylalkyl group, e.g., $\beta$-methoxycarbonylethyl, $\omega$-ethoxycarbonylbutyl, etc., or an aryl group, e.g., phenyl, tolyl, naphthyl, methoxyphenyl, chlorophenyl, etc.; $R_2$ and $R_3$ each represents an alkyl group, e.g., methyl, ethyl, propyl, isopropyl, butyl, heptyl, decyl, etc. or an aryl group, e.g. phenyl, tolyl, etc., or an aralkyl group, e.g. benzyl, etc.; $R_4$ and $R_5$ each represents an aryl group, e.g., phenyl, tolyl, chlorophenyl, methoxyphenyl, naphthyl, etc.;D represents a cation such as an alkali metal, a ammonium, an amine such as triethylamine, pyridine, etc., cations; and Z and $Z_1$ each represents the non-metallic atoms necessary to complete the same or different 5- to 6-membered heterocylic nucleus of the type used in cyanine dyes, which nucleus may contain a second hetero atom such as oxygen, sulfur, selenium or nitrogen,such as the following nuclei: a thiazole nucleus,e.g.,thiazole, 4-methylthiazole, 4-phenylthiazole, 5-methylthiazole, 5-phenylthiazole, 4,5-dimethylthiazole, 4,5 - diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiale, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naphtho[1,2-d]thiazole, 5-methoxynaphtho[2,3-d]thiazole, 5-ethoxynaphtho[2,3-d]thiazole, 8-methoxynaphtho[2,3-d]thiazole, 7-methoxynaphtho[2,3-d]thiazole, 4'-methoxythianaptheno-7',6',4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6- hydroxybenzoxazole, naphtho[2,1-d]oxazole, naphtho[1,2-d]-oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylindolenine nucleus, e.g., 3,3-dimethylindolenine, 3,3,5-trimethylindolenine, etc.; and, an imidazole nucleus, e.g., imidazole, 1-alkylimidazole, 1alkyl-4-phenylimidazole, 1-alkyl-4,5-dimethylimidazole, benzimidazole, 1-alkyl-benzimidazole, 1-aryl-5,6-dichlorobenzimidazole, 1-alkyl-1H-naphth[1,2-d]imidazole, 1-aryl-3H-naphth[1,2-d]imidazole, 1-alkyl-5-methoxy-1H-naphth-[1,2-d]imidazole, and the like nuclei. Dyes of Formula I above wherein Z represents the atoms necessary to complete a thiazole nucleus are useful in the invention both as filter dyes and as spectral sensitizers for light sensitive silver halide emulsions. Examples 1 and 10 herein illustrate dyes of this type. The preferred methine dyes of the invention are the merocyanines defined in Formulas I and II above, these dyes being especially useful as filter dye layers in photographic elements.

The merocyanine dyes defined in Formula I above are conveniently prepared, for example, by condensing (1) the sodium salt of a bis(methylsulfonyl) methane corresponding to the formula:

V. 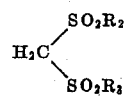

wherein $R_2$ and $R_3$ are as previously defined (prepared by the process of Backer, Rec.trav.chim., 65, 53 (1946)) with (2) a heterocylic compound of the formula:

VI. 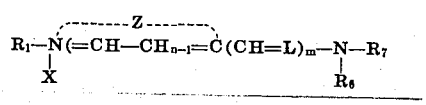

wherein $n$, $m$, $L$, $R_1$ and $Z$ are as previously defined, X represents an acid anion, e.g., chloride, bromide, iodide, thiocyanate, sulfamate, perchlorate, p-toluenesulfonate, methyl sulfate, etc.; $R_6$ represents hydrogen or an acyl group, e.g., acetyl, propionyl, benzoyl, etc.; and $R_7$ represents an aryl group, e.g., phenyl, tolyl, etc., in the proportions of approximately 1 mole of (2) and from 1 to 2 moles of (1), in a solvent such as dimethylacetamide, dimethylsulfoxide, at refluxing temperatures. The dye compounds are then separated from the reaction mixtures by cooling and drowning out the crude dye by the addition of ice and water. The purified dyes can be readily obtained, by one or more recrystallizations from appropriate solvents such as methanol.

To prepare the merocyanine dyes defined in Formula II above, a diarylmethanedisulfonate (1) of the formula:

VII. 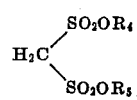

wherein $R_4$ and $R_5$ are as previously defined, is condensed with a heterocyclic compound (2) of Formula VI above wherein Z is replaced by $Z_1$, in approximately equimolar proportions of (1) and (2), in a solvent such as pyridine, acetic anhydride, etc., in the presence of a basic condensing agent such as triethylamine, N-methylpiperidine, N,N-dimethylaniline, etc., at elevated temperatures and preferably at refluxing temperatures of the reaction mixture. The dyes are separated from the reaction mixtures by first cooling and then adding a precipitating solvent such as methanol. The dyes are purified by recrystallizations from appropriate solvents.

The oxonol dyes defined in Formula III above are conveniently prepared by condensing (1) a compound of Formula V with (2) β-anilinoacrolein anil hydrochloride to obtain the trimethine oxonols or with glutaconic aldehyde dianil hydrochloride to obtain the pentamethine oxonols, in the proportions of approximately 2 moles of (1) to each mole of (2), in a solvent such as dimethyl sulfoxide, at boiling temperature for several minutes or more, followed by cooling and precipitating the dye product by the addition of a mixture of ethyl acetate and ether. The liquid residue is washed with ether, dissolved in ethanol, evaporated to dryness, taken up with ethanol, and the dye product precipitated by careful addition of ether and drying. The purified dyes are obtained by recrystallizations from appropriate solvents.

For preparing the oxonol dyes defined by Formula IV above a diarylmethanedisulfonate (1) of Formula VII above is condensed with (2) 1,3,3-trimethoxypropene or with glutaconic aldehyde dianil hydrochloride, preferably in about equimolar proportions of (1) and (2), in a solvent medium such as pyridine, at refluxing temperature of the reaction mixture, in the presence of a basic condensing agent such as mentioned previously, e.g., triethylamine. The reaction mixtures are cooled and ice and water added to precipitate the dye products. The purified dyes are readily obtained by recrystallization from appropriate solvents such as methanol.

In the preparation of non-photographic filter layers coated on a transparent support; or photographic filter layers between differentially sensitized emulsion layers; filter layers on diffusion transfer receiving sheets such as those described in Land U.S. Pat. No. 2,543,181, issued Feb. 27, 1951; filter layers in or upon color print materials such as those described in VanCampen U.S. Pat. No. 2,956,879, issued Oct. 18, 1960; filter layers in or upon color transfer materials such as those described in British Pat. No. 890,861, dated Mar. 7, 1962, Belgian Pat. No. 636,371, and Rogers U.S. Pat. Nos. 3,087,817, issued Apr. 30, 1963 and 2,983,606, issued May 9, 1961; and the like; the dyes of this invention are preferably incorporated in colloid layers which are permeable to aqueous processing solutions, said dyes being employed in concentrations which may vary considerably depending upon the particular product concerned and the effect desired. Suitable support materials for the filter layers include those conventional in the photographic art such as paper, glass, metals, cellulose acetate, cellulose acetate-propionate, polystyrene, polyesters, polyvinyl chloride, polypropylene, etc. Methods for selecting the particular colloid to be employed, and for determining the amount of dye to be included, are well known in the art and need not be enumerated here. Representative colloids which may be employed include natural materials such as gelatin, protein derivatives, albumin, agar-agar, gum arabic, alginic acid and the like; and synthetic resins such as polyvinyl alcohol, polyvinyl pyrrolidone, polyacrylamide, cellulose ethers and carboxylated derivatives of cellulose ethers, partially hydrolyzed cellulose esters, copolymers of acrylic and methacrylic acids, polymeric latexes or hydrosols, mixtures of these, and the like. Gelatin is the preferred colloid.

In the preparation of photographic silver halide emulsions employing certain dyes of this invention that were mentioned hereinabove as having useful spectral sensitizing properties, the dyes are advantageously incorporated in the washed, finished, silver halide emulsion and should be uniformly distributed throughout the emulsion. Methods of incorporating dyes in emulsions are relatively simple and well known to those familiar with the art of emulsion making. For example, the dyes may be added from solutions in appropriate solvents which are free from deleterious effects on the ultimate light-sensitive materials. Methanol, isopropanol, and pyridine, alone or in admixture, have proven satisfactory as solvents for incorporating the majority of the dyes of this invention into emulsions.

The types of silver halide emulsions that can be sensitized with the spectral sensitizing type of dyes of this invention include any of the conventional emulsions prepared with light-sensitive silver salts including silver chloride, silver bromide, silver iodide, silver chlorobromide, silver bromoiodide, silver chlorobromoiodide, etc. The concentration of the new dyes in the emulsion can vary widely, e.g., from about 5 to about 100 mg. per liter of flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the spectral sensitizing type of dyes of this invention, the following procedure is satisfactory. A quantity of the dye is dissolved in a suitable solvent and a volume of this solution containing from 5 to 100 mg. of dye is slowly added to about 1 liter of a gelatin-silver halide emulsion. With most of the dyes, 10 to 20 mg. of dye per liter of emulsion suffices to produce the maximum sensitizing effect with the ordinary gelatin-silver bromide (including bromoiodide and chlorobromide) emulsions. With fine grain emulsions, which include most of the ordinarily employed gelatin-silver chloride emulsions, somewhat larger concentrations of dye may be necessary to obtain the optimum sensitizing effect. Suitable support materials for the emulsions include those such as mentioned above. While this procedure has dealt with emulsions comprising gelatin, it will be understood that these remarks apply generally to any emulsions wherein part or all of the gelatin is substituted by another suitable hydrophilic colloid, such as previously mentioned. It will also be understood that the above description is intended to be illustrative and should not be construed as limiting my invention in any sense since it is apparent that the new dyes can be incorporated by other methods in many of the photographic silver halide emulsions and hydrophilic colloid layers customarily employed in the art. For instance, the dyes can be incorporated by bathing a plate or film bearing an emulsion layer in a solution of one of the dyes in an appropriate solvent. Bathing methods, however, are not normally preferred.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al. U.S. Pat. No. 2,322,027, issued June 15, 1943, Fierke et al. U.S. Pat. No. 2,801,171, issued July 30, 1957, Fisher U.S. Pats. Nos. 1,055,155 and 1,102,028, issued Mar. 4, 1913 and June 30, 1914, respectively, and Wilmanns U.S. Pat. No. 2,186,849 issued Jan. 9, 1940. They can also be developed using incorporated developers such as polyhydroxybenzenes, aminophenols, 3-pyrazolidones, and the like.

The invention is further illustrated by the following examples.

EXAMPLE 1

2-[3,3-Bis(methylsulfonyl)allylidene]-3-ethylbenzothiazoline

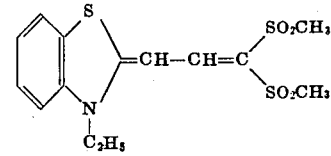

2-$\beta$-Acetanilidovinyl-3-ethylbenzothiazolium iodide (2.25 g., 5 mmol.), the sodium salt of bis(methylsulfonyl) methane (1.94 g., 10 mmol.), and 10 ml. dimethylacetamide are refluxed for 2 minutes and cooled. The dye is drowned out with ice and water and the resulting semi-solid rendered crystalline by stirring in methanol. The dye (1.71 g.) is obtained in 95 percent yield.

The purified dye besides being an excellent light-absorbing dye in photographic layers, also sensitizes silver chloride emulsions to 490 nm. with a maximum sensitivity at 435 nm. The melting point and absorption characteristics are shown for this dye in Table 1 hereinafter.

By replacing the hetero salt in the above example with 2-$\beta$-anilinovinyl-1-ethylnaphtho[1,2-d]thiazolium salt and carrying out the reaction in acetic anhydride, the corresponding methine dye, 1-ethyl-2-[3,3-bis(methylsulfonyl)allylidene]-naphtho[1,2-d]thiazoline, is obtained which also functions both as a filter dye and as a spectral sensitizer for light-sensitive silver halide emulsions.

EXAMPLE 2

2-[3,3-Bis(methylsulfonyl)allylidene]-3-ethylbenzoxazoline

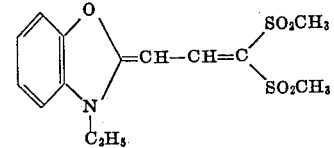

Bis(methylsulfonyl)methane (1.32 g., 7.7 mmol.) is suspended in 7 ml. dimethyl sulfoxide. A 54 percent dispersion of sodium hydride in mineral oil (0.34 g., 7.7 mmol.) is added. When the evolution of hydrogen has ceased, 2-$\beta$-acetanilidovinyl-3-ethylbenzothiazolium iodide (3.04 g., 7 mmol.) is added. The mixture is stirred at 150° C. for 2 minutes and cooled. The crude dye is drowned out with ice and water. The yield of dried dye is 2.04 g. (85 percent). Table 1 which follows lists the absorption properties and melting point of this dye.

EXAMPLE 3

2-[3,3-Bis(methylsulfonyl)allylidene]-3-methylthiazolidine

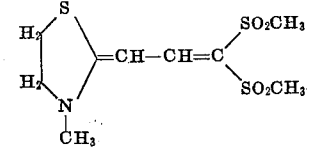

This dye is prepared like Example 2, except that the hetero salt therein is substituted by 2-$\beta$-acetanilido-vinyl-3-methyl-2-thiazolinium iodide (2.72 g., 7 mmol.). The yield of dye (1.51 g.) is 72 percent. Excellent filter layers for screening out ultraviolet radiations in photographic elements are obtained with the above dye. The absorption characteristics and melting point are recorded in Table 1 hereinafter.

By replacing the hetero salt intermediate in the above example with a 2-(4-acetanilidobutadienyl)-3-methyl-2-thiazolinium salt, the corresponding dye 2-[5,5-bis(methylsulfonyl)-2,4-pentadienyl]-3-methylthiazolidine is obtained which, in addition to being a useful filter dye, also functions as a useful spectral sensitizer for light-sensitive silver halide emulsions.

EXAMPLE 4

2-[3,3-Bis(heptylsulfonyl)allylidene]-3-ethylbenzoxazoline

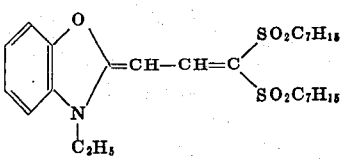

Bis(heptylsulfonyl)methane (3.40 g., 10 mmol.) is suspended in 20 ml. dimethyl sulfoxide. A 54 percent dispersion of sodium hydride in mineral oil is added and the mixture is allowed to stand until hydrogen evolution has ceased. 2-β-Acetanilidovinyl-3-ethylbenzoxazolium iodide is added and the mixture stirred at 120°–130° C. for 10 minutes. The dye is drowned out with ice and water and allowed to stand overnight. The yield of dye (4.94 g.) is 95 percent. As shown in Table 1 hereinafter, this dye has excellent absorption properties for ultraviolet radiations.

EXAMPLE 5

3-Ethyl-2-(3,3-diphenoxysulfonylallylidene)benzothiazoline

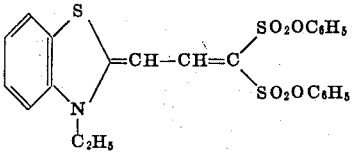

2-β-Acetanilidovinyl-3-ethylbenzothiazolium iodide (3.15 g., 7 mmol.) diphenyl methanedisulfonate (2.30 g., 7 mmol.), pyridine (15 ml.) and triethylamine (1.5 ml.) are refluxed for 4 minutes and cooled. On dilution with methanol the dye separates. The yield of dye is 3.42 g. (95 percent).

EXAMPLE 6

3-Ethyl-2-(3,3-diphenoxysulfonylallylidene)benzoxazoline

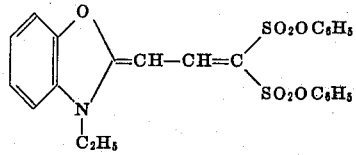

This dye is prepared exactly as in Example 5, except that the heterocyclic salt therein is substituted by 2-β-acetanilidovinyl-3-ethylbenzoxazolium iodide. The yield of dye is 3.12 g. (89 percent).

EXAMPLE 7

3-Methyl-2-(3,3-diphenoxysulfonylallylidene)thiazolidine

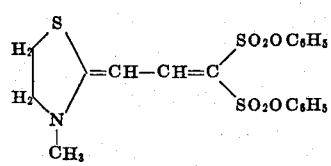

This dye is prepared exactly as in Example 5, except that the heterocyclic salt therein is substituted by 2-β-acetanilidovinyl-3-methyl-2-thiazolinium iodide. The yield of dye is 2.83 g. (89 percent).

EXAMPLE 8

1-Ethyl-2-(3,3-diphenoxysulfonylallylidene)naphtho[1,2-d]-thiazoline

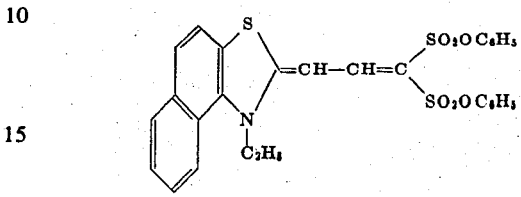

2-β-Anilinovinyl-1-ethylnaphtho[1,2-d]thiazolium iodide (3.51 g., 7 mmol.), diphenyl methanedisulfonate (2.29 g., 7 mmol.), acetic anhydride (1.0 g.), triethylamine (2.0 ml.) and pyridine (15 ml.) are refluxed for 4 minutes. The product separates on the addition of methanol. The yield of dye is 3.74 g. (95 percent).

EXAMPLE 9

1-Ethyl-4-(3,3-diphenoxysulfonylallylidene)-1,4-dihydroquinoline

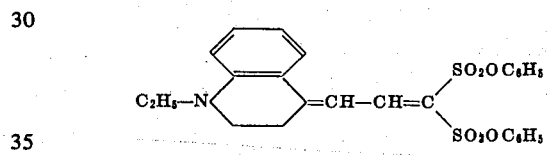

4-β-Anilinovinyl-1-ethylquinolinium iodide (2.81 g. 7 mmol.), diphenyl methanedisulfonate (2.30 g., 7 mmol.), acetic anhydride (1.0 ml.) triethylamine (2.0 ml.) and pyridine (15 ml.) are refluxed for 5 minutes and cooled. The precipitate is obtained on dilution with methanol when seeded. The yield of dye is 2.39 g. (67 percent).

The melting points and the absorption characteristics of the dyes of above Examples 5 to 9 are listed in Table 1 hereinafter.

EXAMPLE 10

2-[5,5-Bis(methylsulfonyl)-2,4-pentadienylidene]-3-ethyl-benzothiazoline

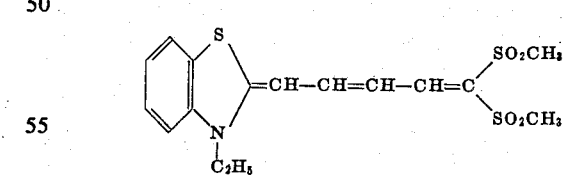

2-(4-Acetanilidobutadienyl)-3-ethylbenzothiazolium iodide (2.38 g., 5 mmol.), the sodium salt of bis(methylsulfonyl)methane (1.94 g., 10 mmol.), and dimethylacetamide (10 ml.) are refluxed for 2 minutes and cooled. The dye is drowned out with ice and water and let stand to crystallize. The yield of crude dye is 1.40 g. (72 percent). The melting point and the absorption characteristics for this dye are listed in Table 1 hereinafter. The pure dye is also an excellent spectral sensitizer light-sensitive photographic silver halide emulsions up to about 600 nm. with a maximum sensitivity at 540 nm.

In place of the heterocyclic compound in the above example, there can be substituted 2-(4-anilinobutadienyl)-1-ethyl-naphtho[1,2-d]thiazolium salt to give the corresponding dye 1-ethyl-2-[5,5-bis(methylsulfonyl)-2,4-pentadienylidene]-naphtho[1,2-d]thiazoline, which functions both as a filter dye and as a spectral sensitizer for light-sensitive silver halide emulsions. The related intermediates such as the naphtho[2,1-d]thiazolium salts, as well as the related naphtho[2,3-d] thiazolium slats, can likewise be substituted in the above example to give the corresponding methine dyes which also are useful filter dyes and spectral sensitizers.

EXAMPLE 11

3-Ethyl-2-(5,5-diphenoxysulfonyl-2,4-pentadienylidene)-benzothiazoline

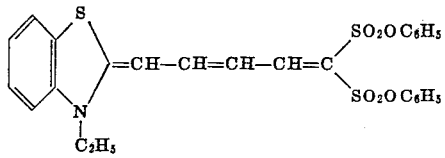

2-(4-Acetanilidobutadienyl)-3-ethylbenzothiazolium iodide (3.33 g., 7 mmol.) diphenyl methanedisulfonate (2.76 g., 1.4 mmol.) acetic anhydride (1.0 ml.), triethylamine (2.0 ml.), and pyridine (15 ml.) are refluxed together for 3 minutes and cooled. The product separates on the addition of methanol. This is grossly contaminated with the thiadicarbocyanine. The separation is not achieved by recrystallization from pyridine and methanol. It is chromatographed on neutral alumina using $CH_2Cl_2$. The separation is accomplished by extruding the alumina from the column and extracting the dye with chloroform. The yield of pure dye from the column is 0.92 g. (24 percent). This dye has a melting point of 216°–7° C. It absorbs strongly in the green region of the spectrum with a maximum sensitivity at 512 nm.

EXAMPLE 12

Bis[bis(methylsulfonyl)methane]trimethine oxonol, sodium salt

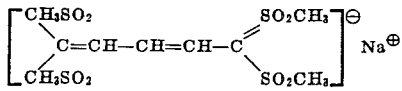

Bis(methylsulfonyl)methane (2.41 g., 14 mmol.) is suspended in dimethyl sulfoxide (10 ml.) and a 54 percent dispersion of sodium hydride in mineral oil (0.62 g., 14 mmol.) added. After the effervescence has ceased, β-anilinoacrolein anil hydrochloride (1.8 g., 7 mmol.) is added. The mixture is boiled for two minutes, cooled, and the product precipitated with ethyl acetate and ether. The liquid residue is washed with ether, dissolved in ethanol, evaporated to dryness, and taken up again in ethanol. The product is precipitated by careful addition of ether. The yield of dye (1,84 g.) is 65 percent.

EXAMPLE 13

Bis(diphenyl methanedisulfonate)trimethineoxonol, pyridine salt

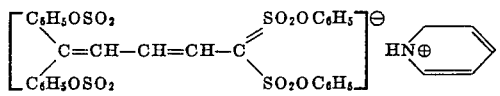

Diphenyl methanedisulfonate (4.60 g., 14 mmol.), 1,1,3-trimethoxypropene (1.85 g., 14 mmol.) pyridine (15 ml.) and triethylamine (2.0 ml.) are refluxed for five minutes and cooled. The addition of ice and water to the mixture precipitates an oil which crystallizes when the mixture is acidified with conc. hydrochloric acid. The mass is recrystallized from acidified methanol yielding 4.19 g. (77 percent) of the dye.

The oxonol dyes of the invention represented by above Example 12 and 13 are excellent filter dyes for screening out ultraviolet radiations in photographic elements. The melting points and the absorption characteristics of these dyes are recorded in Table 1 below.

The light absorbing characteristics of the novel dyes of this invention are determined in methanol solutions of the dyes using a Perkin-Elmer spectrophotometer. The values of maximum absorption peaks and the coefficient of extinction is given for each of the dyes, together with their yields, melting points and recrystallization solvents, of above Examples 1 to 13 in Table 1 immediately below.

TABLE 1

| Ex. No. | Yield [1] (percent) | Recrystallized from— | Melting point (° C.) | Absorption in methanol solution Max. | E×10⁻⁴ |
|---|---|---|---|---|---|
| 1 | 60 | Ethanol | 222–3 | 419 | 7.0 |
| 2 | 71 | Pyridine/methanol | 246–8 | 383 | 8.4 |
| 3 | 44 | do | 229–30 | 364 | 6.4 |
| 4 | 61 | Methanol | 98–105 | 385 | |
| 5 | 78 | Pyridine/methanol | 179–81 | 426 | 6.8 |
| 6 | 61 | do | 154–6 | 390 | 7.0 |
| 7 | 74 | do | 172–4 | 369 | 5.8 |
| 8 | 74 | DMF/methanol | 252–5 | 447 | 6.3 |
| 9 | 50 | do | 186–8 | 502 | 7.1 |
| 10 | 15 | Pyridine/methanol | 217–8 | 512 | 12.2 |
| 11 | 24 | (Chromatography) | 216–7 | 522 | 16.4 |
| 12 | 21 | Ethanol | [2] 174–6 | 382 | 6.0 |
| 13 | 69 | Methanol | 172–4 | 392 | 7.8 |

[1] After two recrystallizations.
[2] Dec.

EXAMPLE 14

A composition comprising gelatin, coating aids, hardeners, and the ultraviolet light-absorbing dye of Example 2, 2-[3,3-bis(methylsulfonyl)allylidene]-3-ethylbenzoxazoline was coated above the blue sensitive layer of a multilayer reversal color film of the type described in Mannes et al. U.S. Pat. No. 2,252,718, issued Aug. 19, 1941. The resultant element had 90 mg./ft.² of gelatin and 30 mg./ft.² of the above dye in the overcoat. A similar element without the light-absorbing overcoat was used as a control. Spectrophotometric exposures demonstrated a significant decrease in ultraviolet sensitivity of the overcoated element of the invention relative to the control element. Practical picture tests confirmed this protection. Pictures obtained with this element gave a color balance similar to those obtained with the control element when the control element was exposed through a Kodak 2A Wratten filter which transmits only above about 400 nm.

Various tests of physical properties which are customarily made on coatings of this type such as vertical swell, fold, wedge brittleness, ferrotyping, gate friction, and the like gave results which indicated that the control element and the overcoated element of the invention had essentially equal physical properties.

The following example illustrates photographic elements prepared with the novel silver halide emulsions of the invention.

EXAMPLE 15

The sensitizing effects in photographic elements of certain of the new dyes of the invention as illustrated by Examples 1 and 10, are determined as follows:

The dyes dissolved in suitable solvents, are added to separate portions of either a silver chloride emulsion or a silver chlorobromide (60:40) emulsion in the concentration range of about from 0.05 to .15 grams per mole of silver. After digestion at 50° C. for 10 minutes, the emulsions in each case are coated at a coverage of 432 mg. of silver per square foot and 1,190 mg. of gelatin per square foot on a cellulose acetate film support. A sample of each coating is exposed on an Eastman 1B sensitometer and to a wedge spectrograph, processed in a developer of the composition:

| | |
|---|---|
| N-methyl-p-aminophenol sulfate | 2.0 g. |
| Sodium sulfite (anhydrous) | 90.0 g. |

| | |
|---|---|
| Hydroquinone | 8.0 g. |
| Sodium Carbonate (monohydrate) | 52.5 g. |
| Potassium bromide | 5.0 g. |
| Water to make | 1.0 liter | and then fixed, washed, and dried. The sensitizing results for the dye of Example 1 indicate a sensitivity up to about 490 nm. with maximum sensitivity at 435 nm., and for the dye of Example 10 a sensitivity up to about 600 nm. with maximum sensitivity at 540 nm.

The invention has been described in detail with particular reference to preferred embodiments thereof, but, it will be understood that variations and modifications can be effected within the spirit and scope of the invention.

We claim:

1. A photographic element comprising a support having thereon at least one light-sensitive silver halide emulsion layer, and at least one non-sensitive layer containing a methine dye selected from the group consisting of a merocyanine dye comprising a five- to six-membered nitrogen containing heterocyclic nucleus of the type used in cyanine dyes substituted on a carbon atom thereof by a member selected from those consisting of a 3,3-bis(alkylsulfonyl)allylidene group, a 5,5-bis(alkylsulfonyl)-2,4-pentadienylidene group, 3,3-diaryloxysulfonylallylidene group and a 5,5-diaryloxysulfonyl-2,4-pentadienylidene group; a bis[bis(alkylsulfonyl)methane]trimethine oxonol dye salt; a bis[bis(alkylsulfonyl)methane]pentamethine oxonol dye salt; a bis(diaryl methanedisulfonate)trimethine oxonol dye salt; and, a bis(diaryl methanedisulfonate)pentamethine oxonol dye salt.

2. A photographic element comprising a support having thereon at least one light-sensitive silver halide emulsion layer and at least one non-sensitive layer containing a methine dye selected from those represented by one of the following formulas:

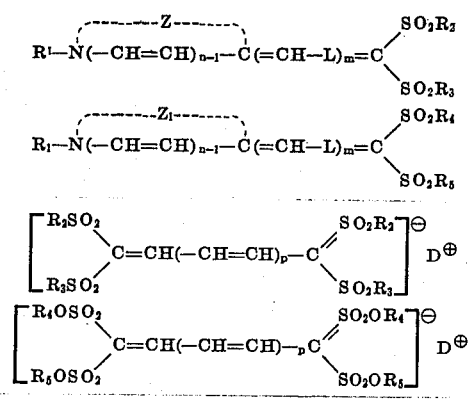

wherein $n$, $m$ and $p$ each represents a positive integer of from 1 to 2; L represents a methine linkage; $R_1$ represents a member selected from the group consisting of an alkyl group and an aryl group; $R_2$ and $R_3$ each represents an alkyl group; $R_4$ and $R_5$ each represents an aryl group; D represents a cation; and Z and $Z_1$ each represents the non-metallic atoms necessary to complete a heterocyclic nucleus of the type used in cyanine dyes containing from five to six atoms in the heterocyclic ring.

3. A photographic element comprising a support having thereon at least one light-sensitive silver halide emulsion layer, and at least one non-sensitive layer containing a methine dye represented by the following formula:

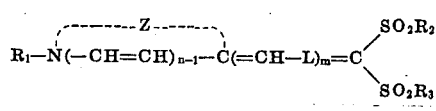

wherein $n$ and $m$ each represents a positive integer of from 1 to 2; L represents a methine linkage; $R_1$ represents a member selected from the group consisting of an alkyl group and an aryl group; $R_2$ and $R_3$ each represents an alkyl group; and Z represents the non-metallic atoms necessary to complete a heterocyclic nucleus of the type used in cyanine dyes containing from five to six atoms in the heterocyclic ring.

4. A photographic element comprising a support having thereon at least one light-sensitive silver halide emulsion layer, and at least one non-sensitive layer containing a methine dye represented by the following formula:

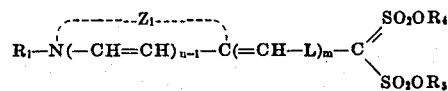

wherein $n$ and $m$ each represents a positive integer of from 1 to 2; L represents a methine linkage; $R_1$ represents a member selected from the group consisting of an alkyl group and an aryl group; $R_4$ and $R_5$ each represents an aryl group; and $Z_1$ represents the non-metallic atoms necessary to complete a heterocyclic nucleus of the type used in cyanine dyes containing from five to six atoms in the heterocyclic ring.

5. A photographic element comprising a support having thereon at least one light-sensitive silver halide emulsion layer and at least one non-sensitive layer containing a methine dye selected from the group consisting of 2-[3,3-bis(methylsulfonyl)allylidene]-3-ethylbenzothiozoline; 2-[3,3-bis(methylsulfonyl)allylidene]-3-ethylbenzoxazoline; 2-[3,3-bis(methylsulfonyl)allylidene]-3-methylthiazolidine; 2-[3,3-bis(heptylulfonyl)allylidene]-3-ethylbenzoxazoline; 3-ethyl-2-(3,3-diphenoxysulfonylallylidene)benzothiazoline; 3-ethyl-2-(3,3-diphenoxysulfonylallylidene)benzoxazoline; 3-methyl-2-(3,3-diphenoxysulfonylallylidene)thiazolidine; 1-ethyl-2-(3,3-diphenoxysulfonylallylidene)naphthoi[1,2-d]-thiazoline; 1-ethyl-4-(3,3-diphenoxysulfonylallylidene)-1,4-dihydroquinoline; 2-[5,5-bis(methylsulfonyl)-2,4-pentadienylidene]-3-ethylbenzothiazoline; 3-ethyl-2-(5,5-diphenoxysulfonyl-2,4-pentadienylidene)benzothiazoline; bis[bis(methylsulfonyl)methane]trimethine oxonol salt and bis(diphenyl methanedisulfonate)trimethine oxonol salt.

6. A light-sensitive photographic silver halide emulsion containing a methine dye represented by the following formula:

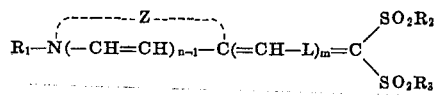

wherein $n$ represents the positive integer 1; $m$ represents a positive integer of from 1 to 2; $R_1$ represents a member selected from the group consisting of an alkyl group and an aryl group; $R_2$ and $R_3$ each represents an alkyl group; and Z represents the non-metallic atoms necessary to complete a thiazole group.

7. A photographic emulsion in accordance with claim 6 wherein said Z of said dye represents the non-metallic atoms necessary to complete a benzothiazole nucleus.

8. A photographic emulsion in accordance with claim 6 wherein said $m$ is 2 and said Z of said dye represents the non-metallic atoms necessary to complete a thiazolidine nucleus.

9. A photographic emulsion in accordance with claim 6 wherein said Z of said dye represents a naptho-thiazole nucleus.

10. A light-sensitive photographic silver halide emulsion containing a methine dye selected from the group consisting of 2-[3,3-bis(methylsulfonyl)allylidene]-3-ethylbenzothiazoline; 2-[3,3-bis(methylsulfonyl)allylidene]-3-ethylbenzoxazoline; 2-[3,3-bis (methylsulfonyl)allylidene]-3-methylthiazolidine; 2-[3,3-bis(heptylsufonyl)allylidene]-3- ethylbenzoxazoline: 3-ethyl-2-(3,3-diphenoxysulfonylallylidene)benzothiazoline; 3-ethyl-2-(3,3-diphenoxysulfonylallylidene)benzoxazoline; 3-methyl-2-(3,3-diphenoxysulfonylallylidene)thiazolidine; 1-ethyl2-(3,3-diphenoxysulfonylallylidene)-naphtho[1,2-d]thiazoline; 1-ethyl-4-(3,3-diphenoxysulfonyl-allylidene)-1,4-dihydroquinoline; and 2-[5,5-bis(methylsulfonyl)-2,4-pentadienylidene]-3-ethylbenzothiazoline.

11. A photographic element comprising a support having thereon a layer containing a photographic emulsion of claim 6.

12. A photographic element comprising a support having thereon a layer containing a photographic emulsion of claim 7.

13. A photographic element comprising a support having thereon a layer containing a photographic emulsion of claim 8.

14. A photographic element comprising a support having thereon a layer containing a photographic emulsion of claim 9.

15. A photographic element comprising a support having thereon a layer containing a photographic emulsion of claim 10.

16. A photographic silver halide emulsion spectrally sensitized with 2-[3,3-bis(methylsulfonyl)allylidene]-3-ethylbenzothiazoline.

* * * * *